United States Patent [19]

Koumura et al.

[11] Patent Number: 4,463,361

[45] Date of Patent: Jul. 31, 1984

[54] INK JET RECORDING APPARATUS WITH VACUUM PLATEN

[75] Inventors: Noboru Koumura, Narashino; Naoki Ayata, Machida; Seiji Saito, Yokosuka; Hidetoshi Suzuki; Kunitaka Ozawa, both of Tokyo, all of Japan

[73] Assignee: Canon Kabushiki Kaisha, Tokyo, Japan

[21] Appl. No.: 420,704

[22] Filed: Sep. 21, 1982

[30] Foreign Application Priority Data

| | | | |
|---|---|---|---|
| Oct. 7, 1981 | [JP] | Japan | 56-158656 |
| Oct. 7, 1981 | [JP] | Japan | 56-158658 |

[51] Int. Cl.$^3$ .................... G01D 15/18; G03B 27/60

[52] U.S. Cl. .................................... 346/134; 346/75; 346/140 R; 355/73

[58] Field of Search ............ 346/134, 136, 75, 140 R; 355/24, 73, 76; 271/4

[56] References Cited

U.S. PATENT DOCUMENTS

| | | | |
|---|---|---|---|
| 3,154,371 | 10/1964 | Johnson | 346/108 |
| 3,674,367 | 7/1972 | Chapman | 346/134 |
| 4,080,068 | 3/1978 | Madigan et al. | 355/73 |
| 4,279,504 | 7/1981 | Brown et al. | 355/24 |
| 4,286,870 | 9/1981 | Silverberg | 355/76 |

FOREIGN PATENT DOCUMENTS

| | | | |
|---|---|---|---|
| 1185628 | 1/1965 | Fed. Rep. of Germany | 271/4 |
| 0935487 | 8/1963 | United Kingdom | 271/4 |

*Primary Examiner*—E. A. Goldberg
*Assistant Examiner*—Gerald E. Preston
*Attorney, Agent, or Firm*—Fitzpatrick, Cella, Harper & Scinto

[57] ABSTRACT

A recording apparatus includes a stationary suction member having a number of openings disposed opposite to recording device. Through the openings a suction force is applied to a recording paper to keep the paper in close contact with the stationary suction member for flat registration. Thereby, the flatness of the recording paper at the recording station is attained and the distance between recording means and recording paper is maintained constant.

3 Claims, 3 Drawing Figures

INK JET RECORDING APPARATUS WITH VACUUM PLATEN

BACKGROUND OF THE INVENTION

1. Field of the Invention

The present invention relates to a recording apparatus and more particularly to such recording apparatus in which the recording paper is carried by a paper carrying means under the action of a suction force. According to the invention, the recording paper is carried while keeping it in contact with a stationary suction plate.

2. Description of the Prior Art

In recording with a recording head or heads such as is known in ink jet recording, a certain distance is maintained between the recording head and the recording paper during recording. In this case, it is essential to keep the distance constant at all times during recording. Otherwise, the quality of the recorded image is variable and is often reduced.

In many of the known recording apparatus of the above-mentioned type, therefore, there has been used a paper carrying belt provided with a large number of suction holes formed therein. A negative pressure generation means has been provided on the back side of the belt to apply a negative pressure to the recording paper from the back side through the suction holes. In this manner, the recording paper is held flat on the belt by which the paper is being carried to the recording position. At the recording position, a desired ink jet recording operation on the recording paper held on the belt. However, such a conventional device for carrying the recording paper has been found to have the following drawbacks:

(1) It is very difficult to provide the large number of suction holes in the belt;

(2) The belt is not so arranged as to extend over the whole width of the recording paper. There are portions of the recording paper under which the belt is not present widthwise. Therefore, it is very difficult to attain the same desired flatness of the recording paper for both of the portion at which the belt is present and the portion at which the belt is not present. It is only attainable at great expense.

(3) The device is not easy to assemble.

(4) It needs belt tensioning means and means for the prevention of offset of the belt. Therefore, the structure of the device is very complicated.

SUMMARY OF THE INVENTION

Accordingly, the object of the present invention is to provide a recording apparatus which overcomes the drawbacks of the prior art apparatus mentioned above and in which the recording paper is carried while keeping the paper in contact with a stationary suction plate.

To attain the object according to the invention there is provided a recording apparatus comprising carrying means for transmitting a carrying force to a recording paper to move the paper, a stationary suction plate having a plural number of openings formed therein to such the recording paper, suction means disposed to apply a suction force to the recording paper through the openings and recording means disposed substantially opposed to the stationary suction plate to effect recording.

With the arrangement according to the invention, recording is carried out on a recording paper in the state of intimate contact with the stationary suction plate under the action of suction force. Therefore, according to the invention, the structure of the paper sucking means is simplified very much as compared with the prior art devices. Further, flatness of the recording paper at the recording position is improved. In addition, a substantial cost reduction is attained by the invention.

In the conventional recording apparatus, a number of recording papers are contained in a cassette from which the recording paper is fed to the printing position sheet by sheet. After recording, the recorded paper is discharged into a discharge paper tray. Conventionally, the paper cassette and the discharge paper tray have been provided independently of each other as two separate members.

In a preferred embodiment of the invention, the recorded paper is discharged on the same side of the apparatus as the cassette is provided and the cover plate of the cassette itself serves also as the tray for the discharged paper. A further simplification of the apparatus is attained by this arrangement. This advantageous arrangement is applicable to any type of recording apparatus, copying apparatus and printing apparatus provided that, 00 after recording, the sheet is discharged on the same side as the cassette. In this case, the portion of the cassette to be used to form a tray for discharged sheet is never limited to the upper surface only of the cover plate of the cassette. A discharge paper tray may be formed making use of any surface portion of the cover plate.

Other and further objects, features and advantages of the invention will appear more fully from the following description taken in connection with the accompanying drawings.

DETAILED DESCRIPTION OF THE PREFERRED EMBODIMENTS

Figure 1:
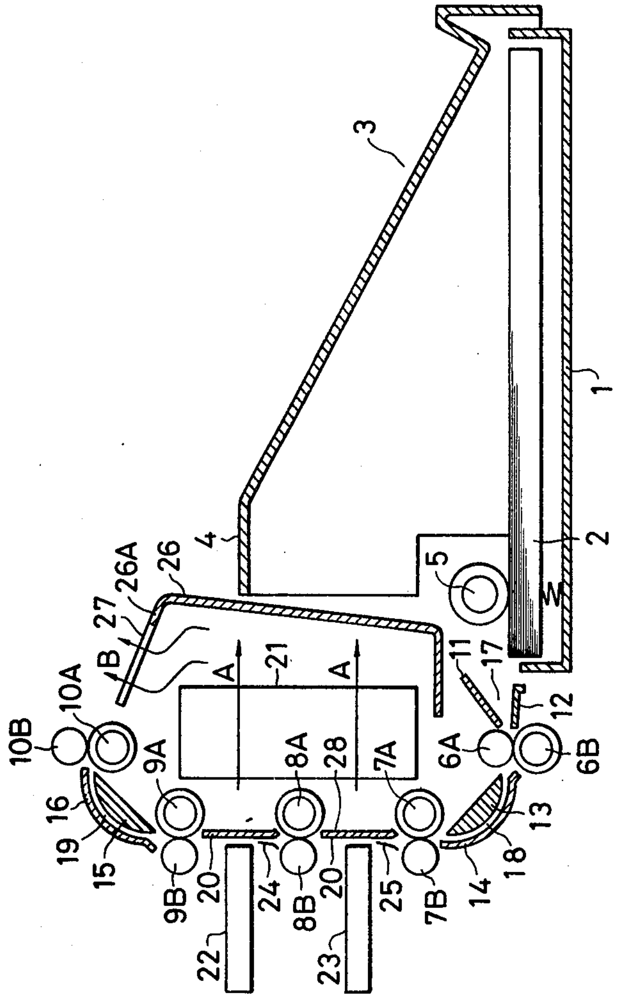
FIG. 1 is a schematic sectional view of a recording apparatus showing an embodiment of the invention.

In FIG. 1 showing a first embodiment of the invention, 1 is a paper cassette in which a number of recording papers 2 are contained. The paper cassette has a cover plate 4 for preventing dust and foreign particles from coming into the interior of the cassette 1. The cover plate 4 is so formed as to serve also as a discharge paper tray 3. 5 is a paper feed roller which is rotated and brought into contact with the stack of recording papers 2 to feed the recording paper sheet by sheet. 6A and 6B are a pair of timing rollers which are driven into rotation in synchronism with reading at an original reading part (not shown) thereby synchronizing the record position on the recording paper with the read position at the reading part.

7A–10A and 7B–10B are a set of rollers for carrying the recording paper 2. 11 to 16 are members for forming guide paths 17, 18 and 19 for the recording paper. The recording paper 2 fed from the cassette 1 is moved forward through these rollers 7A–10A, 7B–10B and guide paths 17–19. 20 is a porous suction plate formed of, for example, a punched metal. 21 is a fan for blowing air in the direction of arrow A. 22 and 23 are recording means such as recording heads. The recording paper 2 is drawn to the suction plate 20 by the fan 21 and brought into the state of intimate contact with the suction plate thereby flattening the paper on the suction plate. With this high flatness of the recording paper 2 on the suction plate 20, the distance between the recording paper 2 and the heads 22, 23 is maintained always constant. 24 and 25 are paper guides made of elastic material. The elastic guides 24 and 25 are so disposed as to form gap that is a smaller than the thickness of the recording paper between the elastic guide and the suction plate 20.

Designated by 26 is a guide for blown air. The air blown from the fan 21 flows upward along the air guide 26. The upper portion of the air guide provides a paper guide path 26A in which openings 27 are provided. As indicated by arrow B, the upward stream of the blown air flows out through the openings 27.

Figure 2:
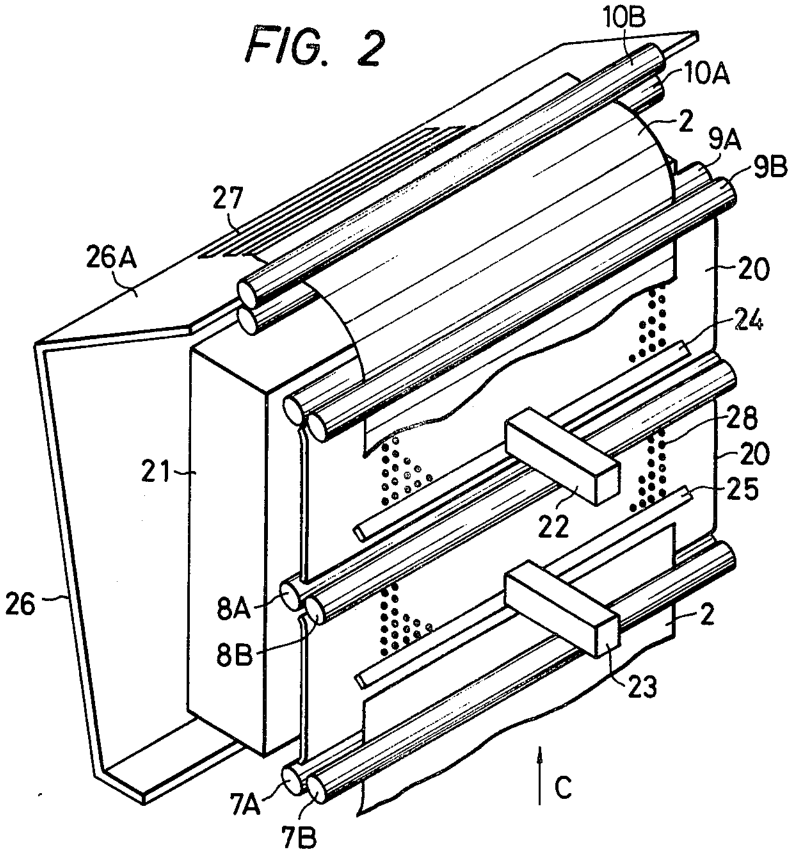
FIG. 2 is a perspective view thereof.

FIG. 2 is a perspective view of the recording apparatus looking from the side of the recording heads. The manner of operation of the recording apparatus shown in FIG. 1 will be described hereinafter with reference to FIG. 2.

In the shown embodiment, the recording head 22 is an ink jet head for recording in red and the recording head 23 is that in black. Signals from the reading part (not shown) are converted into binary signals by a control circuit (not shown). The binary signals are applied, as recording signals, to one or both of the red and black ink jet heads 22 and 23 as desired. All of the elements, recording heads 22, 23, rollers 7A–10A, 7B–10B, paper guides 24, 25, fan 21, blown air guide 26 etc. are mounted and supported on support means to which the suction plate 20 is fixed. That the suction plate is stationary is an important feature of the invention. The recording paper 2 is carried in the direction of arrow C. The large number of the air suction holes 28 extend over a distance smaller than the width of the recording paper in the direction intersecting the direction C. In other words, the distance between the leftmost row of holes 28 and the rightmost row of holes 28 is selected to be smaller than the full width of the recording paper 2. The reason for this is that if the air suction holes 28 are present over the full width of the recording paper, the leading corner edges of the recording paper may engage in some of the holes. This may result in folding or wrinkling of the paper, change in moving speed of the paper or jamming. According to the invention, these troubles are completely eliminated. For the same reason, the openings 27 on the paper guide path 26A have a smaller width than the full width of the recording paper 2.

Figure 3:
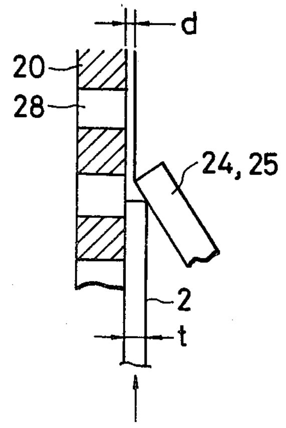
FIG. 3 is a detailed sectional view of the paper guide part of the apparatus.

FIG. 3 illustrates the positional relation between the suction plate 20 and the elastic guides 24, 26. As shown in FIG. 3, the guides 24, 25 are so disposed as to form a gap d smaller than the thickness t of the recording paper 2.

The manner of operation of the recording apparatus will be described in connection with the case where recording is carried out using the black in jet head 23 only.

When the reading of an original is started at the reading part (not shown), at first the paper feed roller 5 (FIG. 1) starts to rotate to feed a first sheet among the recording papers 2 stored within the cassette 1. The timing rollers 6A and 6B are registered with the recording paper 2 fed by the paper feed roller 5. At the same time, the fan blower 21 is also driven. In synchronism with the reading of original at the reading part, the timing rollers 6A and 6B rotate and when the leading end of the recording paper 2 reaches the area of the recording head 23, the head is driven for recording. If desired, the image information read by the reading part may be provisionally stored in a memory.

The recording paper 2 is carried toward the recording head 23 passing through the paper guide paths 17 and 18 as previously mentioned. At this stage, the recording paper 2 is squeezed through the gap between the suction plate 20 and the elastic guide 25 to eliminate curls or the like in the paper. Since, as previously noted, the maximum width of the area of openings 28 on the suction plate 20 is smaller that the width of the recording paper, there is no possibility that the corner portion of the leading edge of the recording paper 2 may engage in the opening 28. Therefore, in the area of the recording head 23, the recording paper 2 is surely drawn onto the suction plate 20 and flattened under the action of suction force. Thereby the desired flatness of the recording paper is attained and the distance between the recording paper 2 and the recording head 23 is maintained constant, which improves the recorded image quality.

After completing the recording with the recording head 23, the recording paper 2 is discharged through carrying rollers 9A, 9B, guide path 19 and carrying rollers 10A, 10B. As previously described, on the guide path 26A immediately behind the rollers 10A, 10B there are provided exit openings 27 for blown air through which the blown air from the fan blower 21 flows out upwardly. Therefore, the recording paper 2 is reliably separated from the guide path 26A of the blown air guide 26 and discharged into the tray 3 without any trouble even when the recording paper has been electrostatically charged.

The tray 3 for discharged recording paper 2 is formed making use of the upper surface of the cover plate 4 for this paper cassette 1. According to the embodiment, therefore, there is no need to provide a particular separate discharge paper tray. This brings forth the advantage that the number of components necessary for the apparatus can be reduced and therefore the initial manufacturing cost of the apparatus can be reduced accordingly.

While the invention has been particularly shown and described with reference to a preferred embodiment thereof, it will be understood by those skilled in the art that various changes and modifications may be made without departing from the spirit and scope of the invention.

We claim:

1. An ink jet recording apparatus comprising:

means for carrying a recording paper while transmitting a carrying force to said recording paper;

ink jet recording means for recording on the recording paper;

a suction member stationarily provided opposed to said recording means and having a plural number of openings formed in an area of the suction member within the width of the recording paper; and suction means for applying a suction force to the recording paper through the openings during recording, said recording paper passing on said suction member in intimate contact therewith.

2. An ink jet recording apparatus according to claim 1, wherein said apparatus further comprises a paper guide member so disposed as to form a gap smaller than the thickness of the recording paper between said guide member and said suction member, the gap between said guide member and said suction member being spread as the recording paper is advanced.

3. An ink jet recording apparatus according to claim 1, wherein said apparatus further comprises a blown air guide member having openings provided in the area downstream of said recording means as viewed in the direction in which said recording paper is carried, said openings being disposed to blow air toward said recording paper from the underside of said paper, by utilizing the discharge air from said suction means.

* * * * *